United States Patent
Hsieh

(10) Patent No.: US 9,140,616 B2
(45) Date of Patent: Sep. 22, 2015

(54) ELECTRONIC SOCKET

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 0 days.

(21) Appl. No.: 14/337,255

(22) Filed: Jul. 22, 2014

(65) Prior Publication Data

US 2015/0053022 A1 Feb. 26, 2015

(30) Foreign Application Priority Data

Aug. 26, 2013 (TW) .............................. 102130482 A

(51) Int. Cl.
*B25B 23/14* (2006.01)
*G01L 3/02* (2006.01)
*B25B 13/06* (2006.01)

(52) U.S. Cl.
CPC . *G01L 3/02* (2013.01); *B25B 13/06* (2013.01); *B25B 23/14* (2013.01)

(58) Field of Classification Search
CPC .... B25B 23/14; B25B 23/1425; B25B 13/06; F16C 11/0619; G01L 5/0042; G01L 3/02

USPC ............ 73/864, 862.22, 862.25, 862.21–862, 73/22

See application file for complete search history.

(56) References Cited

U.S. PATENT DOCUMENTS

| | | | | |
|---|---|---|---|---|
| 5,172,616 | A * | 12/1992 | Negishi | 81/467 |
| 5,331,857 | A * | 7/1994 | Levine et al. | 73/756 |
| 6,055,854 | A * | 5/2000 | Chen | 73/146.8 |
| 7,275,450 | B2 * | 10/2007 | Hirai et al. | 73/862.21 |
| 7,757,540 | B2 * | 7/2010 | Dabrowski | 73/1.12 |
| 2007/0036649 | A1 * | 2/2007 | Louis et al. | 416/1 |
| 2007/0261502 | A1 * | 11/2007 | Steinkamp et al. | 73/862.046 |
| 2009/0227887 | A1 * | 9/2009 | Howard et al. | 600/531 |
| 2011/0278978 | A1 * | 11/2011 | Taniguchi et al. | 310/156.54 |

* cited by examiner

*Primary Examiner* — Max Noori
(74) *Attorney, Agent, or Firm* — CKC & Partners Co., Ltd.

(57) ABSTRACT

An electronic socket is provided. The electronic socket includes a body, a strain gauge, an electronic control module, and a display unit. The body has a driving groove and a passive groove. The driving groove and the passive groove are connected to each other through a channel, wherein the body includes a containing space located on an outside and a recessed groove located in the containing space corresponding to the channel. The strain gauge is disposed in the recessed groove. The electronic control module and a display unit are disposed in the containing space, and the display unit is for showing a data sensed by the electronic control module which obtains from the strain gauge.

10 Claims, 5 Drawing Sheets

ELECTRONIC SOCKET

RELATED APPLICATIONS

This application claims priority to Taiwan Application Serial Number 102130482 filed Aug. 26, 2013, which is herein incorporated by reference.

BACKGROUND

1. Technical Field

The present disclosure relates to a socket. More particularly, the present disclosure relates to an electronic socket.

2. Description of Related Art

As is known, the technology of a hand tool has developed towards electronization for easily using and operating. Therefore, many kinds of electronic hand tools have appeared now on the market.

Screw-driving hand tools are normally used to turn the screw to locate items. When a screw is used in the aviation equipment or other precision instruments, a precise force for turning the screw is needed, even the angle of rotation of the screw must also be considered. Therefore, some industry insiders have developed several kinds of hand tools with a strain gauge inside. In the prior art, an electronic socket with the strain gauge for measuring a torque suffered of the screw is provided. Thus, the conventional electronic socket can provide the tightening force for checking whether the tightening force is over-tightened which would cause damage of the screw, or whether the tightening force is insufficient and the screw should be further tightened. The conventional hand tool can calculate, save and transport a data that is measured by the strain gauge, however, the strain gauge is directly located on a surface of the hand tool, so the analytical sensitivity and the usability of the strain gauge is limited.

Furthermore, the conventional electronic socket can only show and record the data, and can not show a warning message proactively. Moreover, the conventional electronic hand tool has strain gauge projected from outside thereof that would cause the inconvenient operation and the inconvenient storage.

SUMMARY

According to one embodiment of the present disclosure an electronic socket includes a body, a strain gauge, an electronic control module, and a display unit. The body has a driving groove and a passive groove. The driving groove and the passive groove are connected to each other through a channel, wherein a maximum radial length of the channel is greater than a maximum radial length of the driving groove, a maximum radial length of the channel is smaller than a maximum radial length of the passive groove, and the body includes a containing space located on an outside of the body corresponding to the channel and a recessed groove located in the containing space corresponding to the channel. The strain gauge is disposed in the recessed groove. The electronic control module is disposed in the containing space. The display unit is disposed in the containing space, wherein the display unit and the strain gauge are connected to the electronic control module and the display unit can show a data that is sensed by the electronic control module.

Therefore, the recessed groove has been located in the containing space corresponding to the channel, and the recessed groove and the containing space can thin the outside thickness of the channel. Furthermore, the maximum radial length of the channel is greater than the maximum radial length of the driving groove, so the inside thickness of the channel is thinner than the inside thickness of the driving groove. Besides, base on the strain gauge is disposed in the recessed groove, and a slight deformation of the electronic socket can sensitively affect the strain gauge.

According to one example of the embodiment of the present disclosure, the electronic socket further includes a connecting wire detachably connected to the electronic control module. The connecting wire can provide electricity, save the data, and pass out signals. Furthermore, the recessed groove has a flat bottom surface, and the strain gauge is disposed flat on the flat bottom surface of the recessed groove.

According to another embodiment of the present disclosure, an electronic socket includes a body, two strain gauges, an electronic control module, a display unit and a connector. The body has a driving groove and a passive groove connected to each other through a channel, wherein a maximum radial length of the channel is greater than a maximum radial length of the driving groove, a maximum radial length of the channel is smaller than a maximum radial length of the passive groove, and the body comprises two containing spaces located on an outside of the body corresponding to the channel and each containing space includes a recessed groove located in the containing space corresponding to the channel. The two strain gauges are disposed in the two recessed grooves respectively. The electronic control module and the display unit are disposed in one of the containing spaces, wherein the display unit and the strain gauge are connected to the electronic control module and the display unit can show a data that is sensed by the electronic control module. Furthermore, the connector is detachably disposed in another one of the containing spaces, wherein the connector is connected to the electronic control module and the connector offers the data through a connecting wire.

Therefore, another embodiment also can sensitively affect the two strain gauges. The other hand, the display unit and the strain gauge are connected to the electronic control module and the display unit is for showing a data sensed by the electronic control module. Furthermore, the display unit also can show a warning message. Besides, another embodiment can show the data and initiative to send the warning message.

According to one example of another embodiment of the present disclosure, the warning message is light, sound or vibration, and each of the two recessed grooves has a flat bottom surface, and each of the strain gauges is disposed flat on one of the flat bottom surfaces.

According to another example of all embodiments, wherein the strain gauge, the electronic control module and the display unit are disposed in the containing space. Therefore, the cover is used for covering the containing space, and the cover has been engaged with an outer surface of the body for forming a smooth surface.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
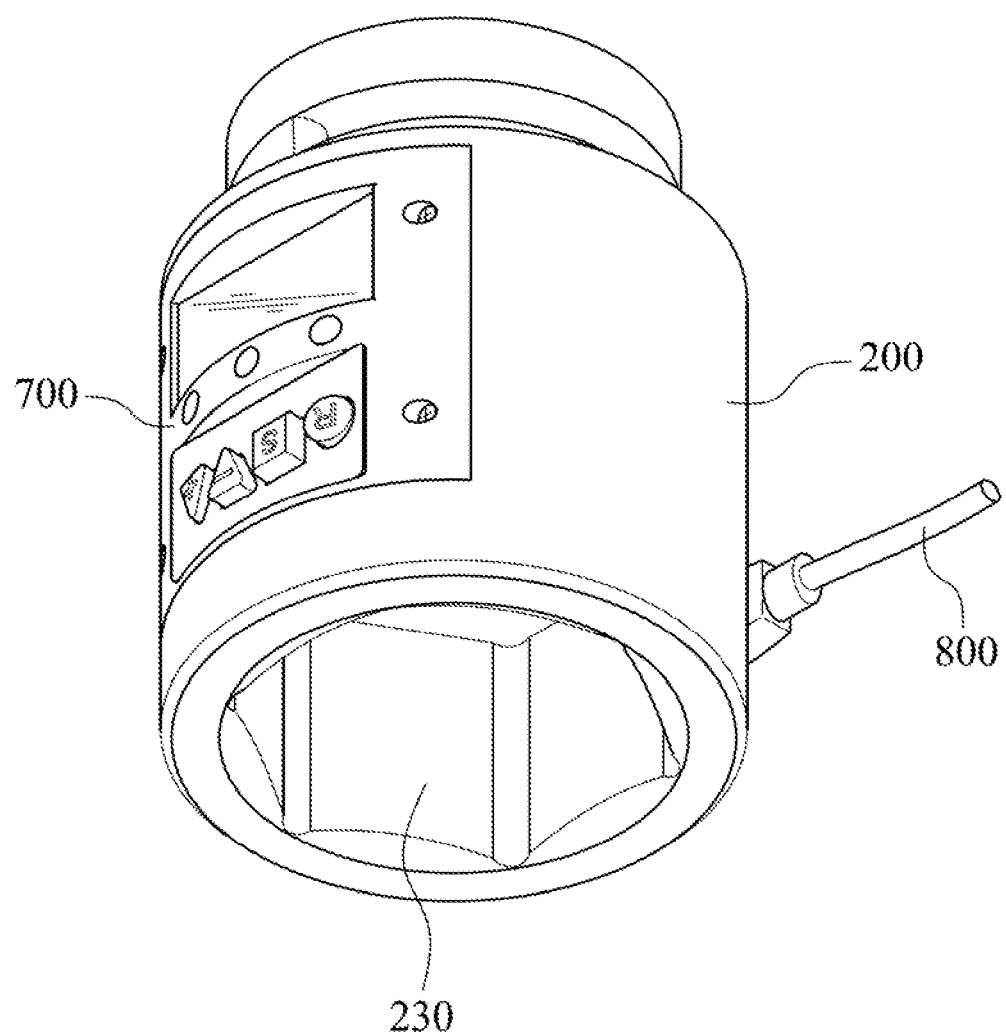
FIG. 1 is a three-dimensional view of an electronic socket according to one embodiment of the present disclosure.
Figure 2:
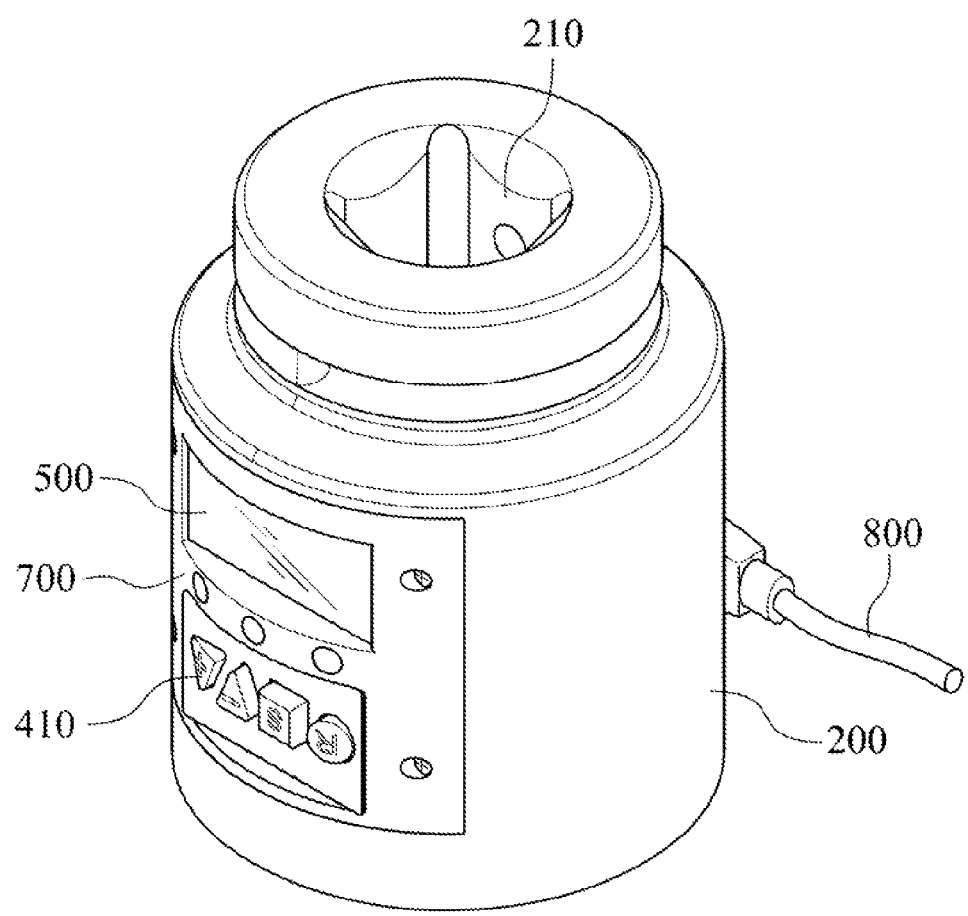
FIG. 2 is another three-dimensional view of the electronic socket in FIG. 1.
Figure 3:
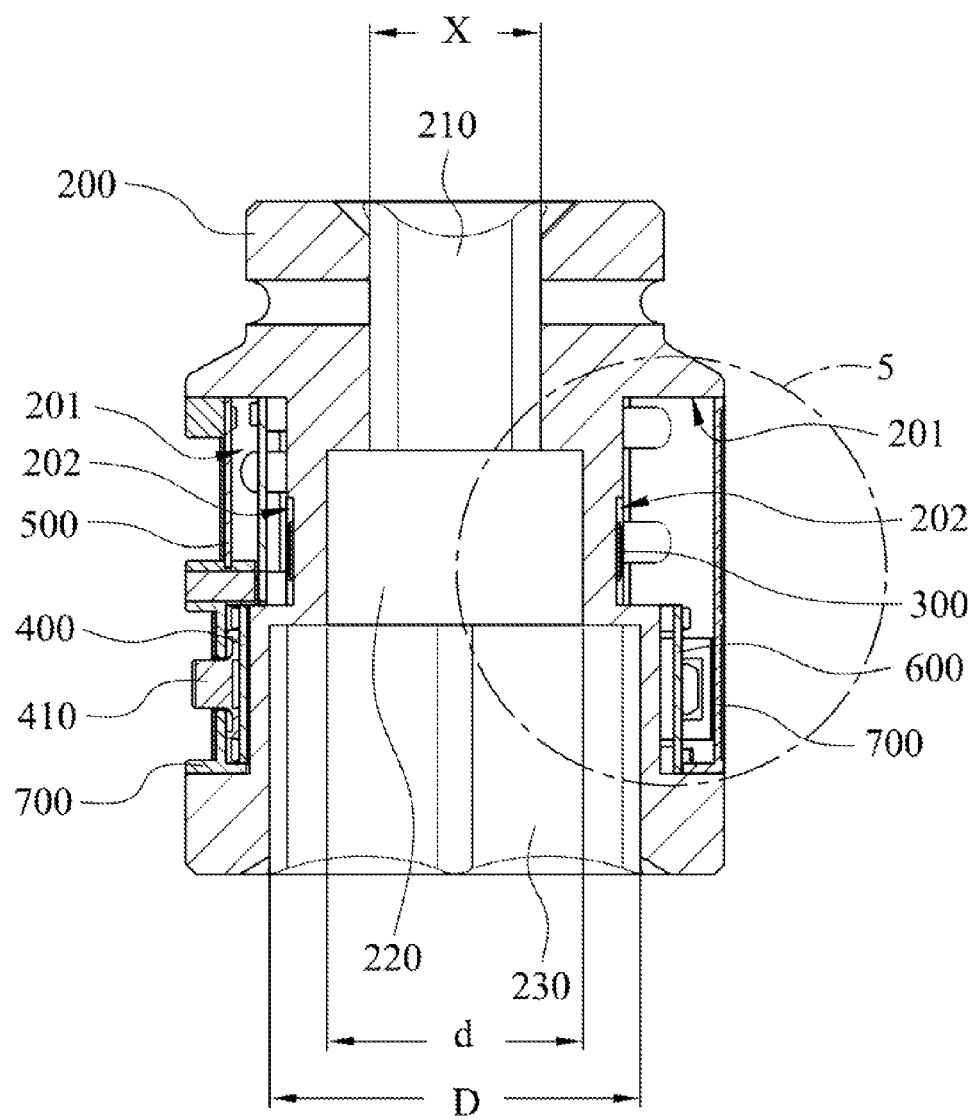
FIG. 3 is a cross-sectional view of the electronic socket in FIG. 1.
Figure 4:
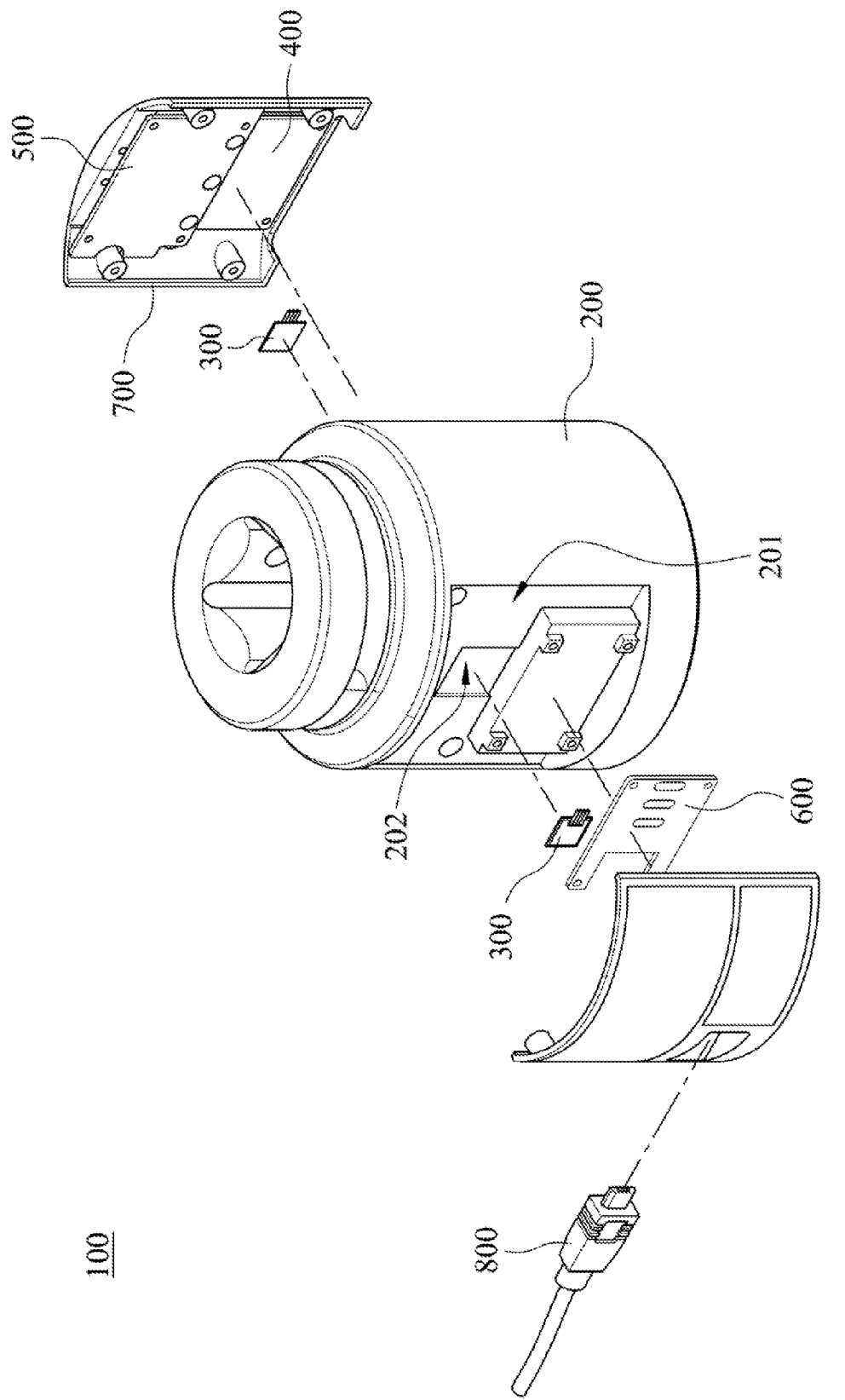
FIG. 4 is a exploded view of the electronic socket in FIG. 1.
Figure 5:
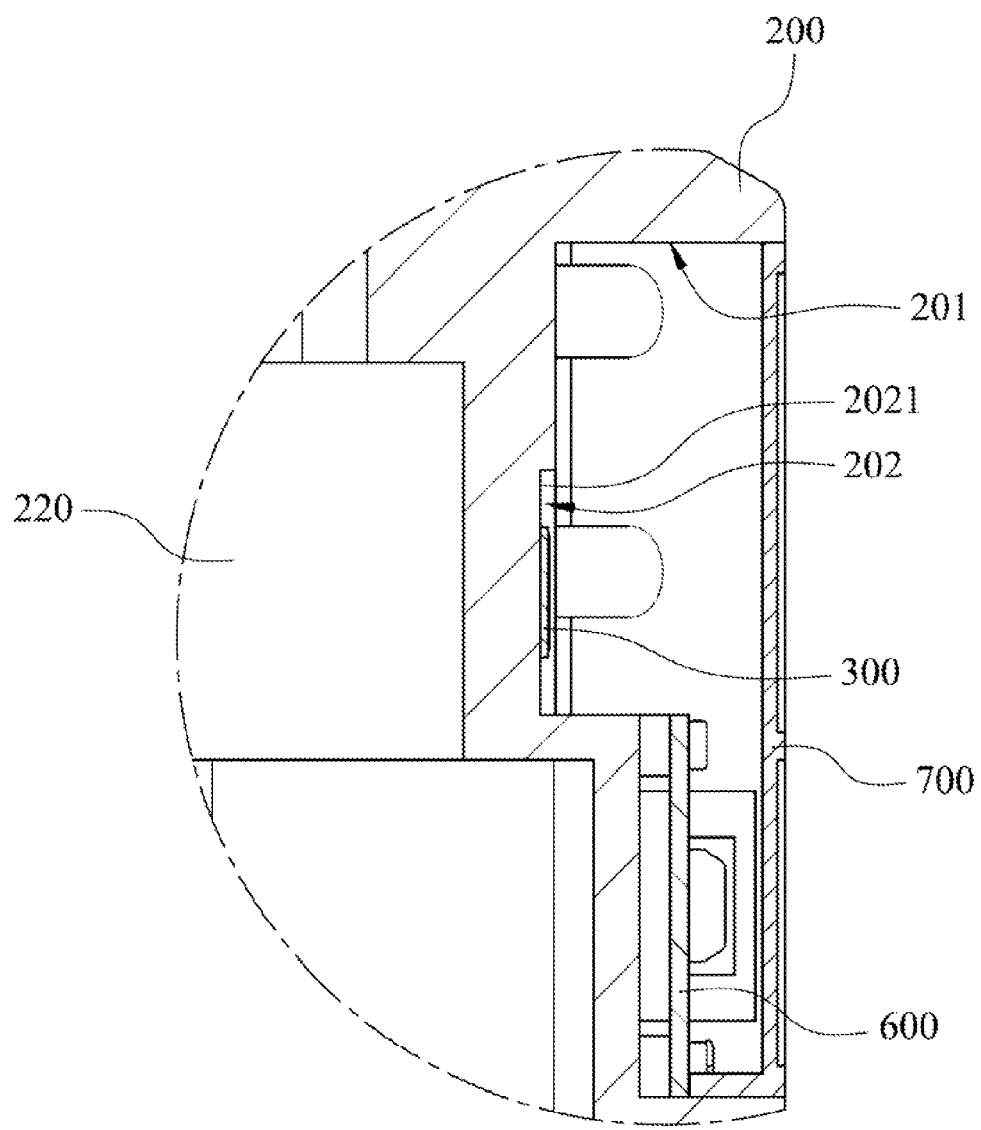
FIG. 5 is a partial enlarged view ref the exploded view of the electronic socket of FIG. 3.

FIG. 1 and FIG. 2 are two three-dimensional views of an electronic socket 100 according to one embodiment of the present disclosure. FIG. 3 is a cross-sectional view of the electronic socket 100 of FIG. 1. FIG. 4 is an exploded view of the electronic socket 100 of FIG. 1. FIG. 5 is a partial enlarged view of the exploded view of the electronic socket 100 of FIG. 3. The electronic socket 100 includes a body 200, two strain gauges 300, an electronic control module 400, a display unit 500, a connector 600, two covers 700, and a connecting wire 800.

The body 200 has a driving groove 210 and a passive groove 230 connected to each other through a channel 220, wherein a maximum radial length d of the channel 220 is greater than a maximum radial length X of the driving groove 210, a maximum radial length d of the channel 220 is smaller than a maximum radial length D of the passive groove 230. The body 200 includes two containing spaces 201 located on an outside of the body 200 corresponding to the channel 220. Both of the two containing spaces 201 are not communicated to the channel 220. Furthermore, each of the two containing spaces 201 includes a recessed groove 202, and the recessed groove 202 is located in the containing space 201 corresponding to the channel 220. Each of the two recessed grooves 202 has flat bottom surface 2021.

The two strain gauges 300 are disposed in the two recessed grooves 202 respectively. Each of the two strain gauges 300 is disposed flat on the flat bottom surface 2021 of each of the recessed grooves 202.

The electronic control module 400 and the display unit 500 are disposed in one of the containing spaces 201, and the display unit 500 is connected to the electronic control module 400. The electronic control module 400 has a plurality of outside buttons 410. The display unit 500 and the strain gauges 300 are connected to the electronic control module 400, so that the display unit 500 can show a data that is sensed by the electronic control module 400. The display unit 500 is made of LED, OLED or liquid crystal display. The display unit 500 can show a warning message with the data that is sensed by the electronic control module 400.

The connector 600 is detachably disposed in the other containing space 201, wherein the connector 600 is connected to the electronic control module 400.

The two covers 700 are detachably screwed on the body 200 for covering the two containing spaces 201 respectively, and each of the two covers 700 is engaged with the outer surface of the body 200 for forming a smooth and cylindrical surface.

The connecting wire 800 passes through one of the covers 700 and is detachably and electrically connected to the connector 600.

According to the above description, the electronic socket 100 according to the present disclosure has advantages as follows. The wall of the channel 220 is thinned corresponding to the driving groove 210 and the passive groove 230 by the arrangement of the recessed groove 202 and the containing space 201. Therefore, the flat bottom surfaces 2021 of the recessed groove 202 would be deformed according to the deformation of the electronic socket 100, and the strain gauges 300 disposed in the recessed groove 202 can sensitively provide the data.

In addition, the covers 700 is detachably screwed on the body 200 for covering the two containing spaces 201, respectively. The covers 700 are engaged with the outer surface of the body 200 for forming a smooth and cylindrical surface. Further, the electronic control module 400, the display unit 500, and the connector 600 are disposed in the containing spaces 201 and covered by the cover 700. Therefore, the electronic socket 100 according to the present disclosure provides a traditional shape, and a user can conveniently operate and satisfy the operating habit.

Moreover, the display unit 500 can show the data and the warning message that is provided by the electronic control module 400, and the warning message is light, sound or vibration. The element for generating the aforementioned warning message can also be disposed in one of the containing spaces 201, and the electronic socket 100 can synchronously generate the data and the warning message.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic socket, comprising:
   a body, having a driving groove and a passive groove connected to each other through a channel, wherein a maximum radial length of the channel is greater than a maximum radial length of the driving groove, a maximum radial length of the channel is smaller than a maximum radial length of the passive groove, and the body comprises a containing space located on an outside of the body corresponding to the channel and a recessed groove located in the containing space corresponding to the channel;
   a strain gauge disposed in the recessed groove;
   an electronic control module disposed in the containing space; and
   a display unit disposed in the containing space, wherein the display unit and the strain gauge are connected to the electronic control module and the display unit is for showing a data sensed by the electronic control module;
   wherein an inside thickness of the channel is thinner than an inside thickness of the driving groove;
   wherein base on the strain gauge is disposed in the recessed groove, and a slight deformation of the electronic socket can sensitively affect the strain gauge.

2. The electronic socket of claim 1, further comprising:
   a connecting wire detachably connected to the electronic control module.

3. The electronic socket of claim 1, wherein the recessed groove has a flat bottom surface, and the strain gauge is disposed flat on the flat bottom surface of the recessed groove.

4. The electronic socket of claim 1, further comprising:
   a cover for covering the containing space, and the cover engaged with an outer surface of the body for forming a smooth surface.

5. An electronic socket, comprising:
   a body having a driving groove and a passive groove connected to each other through a channel, wherein a maximum radial length of the channel is greater than a maximum radial length of the driving groove, a maximum radial length of the channel is smaller than a maximum radial length of the passive groove, and the body comprises two containing spaces located on an outside of the body corresponding to the channel, each of the two containing space comprises a recessed groove located in the containing space corresponding to the channel;

two strain gauges disposed in the two recessed grooves respectively;

an electronic control module and a display unit disposed in one of the containing spaces, wherein the display unit and the strain gauge are connected to the electronic control module and the display unit is for showing a data sensed by the electronic control module; and a connector detachably disposed in another one of the containing spaces, wherein the connector is connected to the electronic control module and the connector offers the data through a connecting wire;

wherein an inside thickness of the channel is thinner than an inside thickness of the driving groove;

wherein base on the strain gauge is disposed in the recessed groove, and a slight deformation of the electronic socket can sensitively affect the strain gauge.

6. The electronic socket of claim 5, wherein the electronic control module is coordinated with the display unit to show a warning message, the warning message is light, sound or vibration.

7. The electronic socket of claim 5, wherein each of the two recessed grooves has a flat bottom surface, and each of the two strain gauges is disposed flat on each of the two flat bottom surfaces.

8. The electronic socket of claim 5, wherein the electronic control module has a plurality of outside buttons.

9. The electronic socket of claim 5, further comprising:
two covers for covering the two containing spaces respectively, and each of the two covers engaged with an outer surface of the body for forming a smooth surface.

10. The electronic socket of claim 9, wherein the connecting wire passes through one of the covers and the connecting wire is detachably connected to the connector.

* * * * *